United States Patent [19]
Saylor

[11] Patent Number: 5,992,898
[45] Date of Patent: Nov. 30, 1999

[54] QUICK-CONNECT ASSEMBLY AND METHOD OF MANUFACTURE

[75] Inventor: Brian K Saylor, Troy, Mich.

[73] Assignee: Echlin, Inc., Branford, Conn.

[21] Appl. No.: 08/916,934

[22] Filed: Aug. 21, 1997

[51] Int. Cl.$^6$ .................................................. F16L 27/08
[52] U.S. Cl. ........................... 285/55; 285/382; 285/276; 29/419.2
[58] Field of Search .............................. 285/55, 382, 256, 285/321, 276, 305, 222.1, 222.2; 29/419.2; 72/707

[56] References Cited

U.S. PATENT DOCUMENTS

| | | | |
|---|---|---|---|
| 3,140,106 | 7/1964 | Thomas et al. | 285/256 |
| 3,175,383 | 3/1965 | Levine | 72/707 |
| 3,224,794 | 12/1965 | Crissy | 285/256 |
| 3,313,536 | 4/1967 | Dutton et al. | 29/419.2 |
| 3,657,519 | 4/1972 | Pease | 219/536 |
| 4,113,288 | 9/1978 | Cox | 285/276 |
| 4,702,543 | 10/1987 | Hager | 29/421.9 |
| 4,783,100 | 11/1988 | Klein | 285/276 |
| 4,804,206 | 2/1989 | Wood et al. | 285/276 |
| 5,350,203 | 9/1994 | McNaughton et al. | . |
| 5,442,846 | 8/1995 | Snaper | . |
| 5,472,244 | 12/1995 | Nishikata et al. | . |
| 5,484,174 | 1/1996 | Gotoh et al. | . |
| 5,498,042 | 3/1996 | Dole | . |
| 5,516,156 | 5/1996 | Williamson | . |
| 5,533,765 | 7/1996 | Williamson | . |
| 5,536,047 | 7/1996 | Detable et al. | . |
| 5,544,858 | 8/1996 | Rogers et al. | . |
| 5,553,895 | 9/1996 | Karl et al. | . |
| 5,595,213 | 1/1997 | Brown | . |
| 5,671,522 | 9/1997 | Aronne | 29/419.2 |
| 5,826,320 | 10/1998 | Rathke et al. | 29/419.2 |

OTHER PUBLICATIONS

"Applications For Magneform," Maxwell Laboratories Inc. (1994).

"Tool and Manufacturing Engineers Handbook," SME (date unknown).

*Primary Examiner*—Eric K. Nicholson
*Attorney, Agent, or Firm*—Reising, Ethington, Barnes, Kisselle, Learman & McCulloch PC

[57] ABSTRACT

A quick-connect assembly that includes a hollow tubular fitting having axially spaced ends and an outer surface with at least one circumferential groove or channel. A tubular conduit of plastic-coated electrically conductive composition is received over one end of the fitting and is magnetically deformed so as to extend into the channel on the fitting adjacent to the one fitting end for fastening the conduit to the fitting. A coupling is rotatably mounted on the opposing end of the fitting for fastening the fitting to a mating coupling, and carries an elastomeric seal in sliding engagement with the conduit or the fitting for preventing leakage of fluid through the assembly.

20 Claims, 2 Drawing Sheets

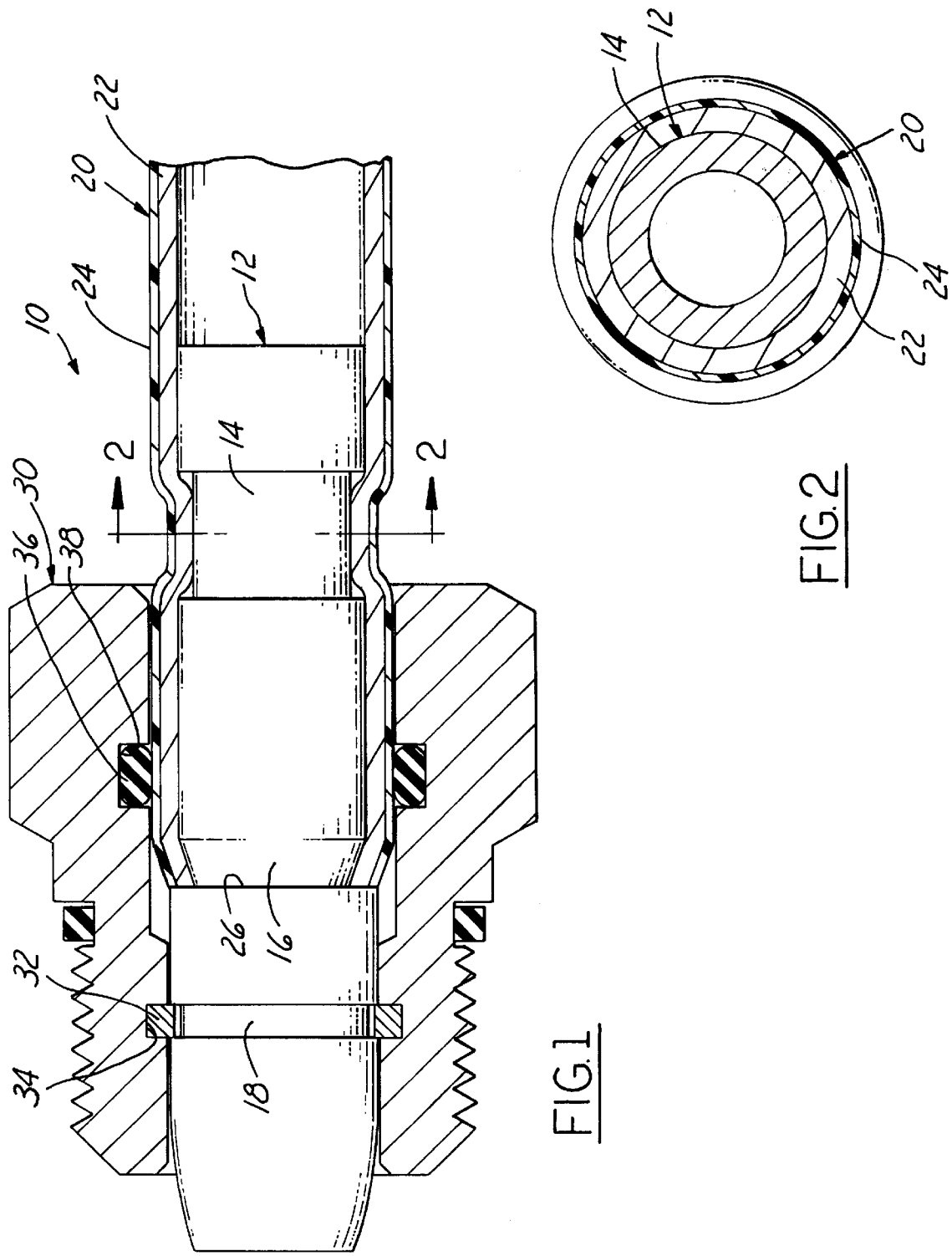

QUICK-CONNECT ASSEMBLY AND METHOD OF MANUFACTURE

The present invention is directed to so-called quick-connect assemblies for interconnecting conduits, and more particularly to an improved method for manufacturing such quick-connect assemblies and the resulting product.

BACKGROUND AND SUMMARY OF THE INVENTION

Quick-connect fittings are employed in many fluid system applications, such as in automotive power steering and brake fluid applications. Many current automotive applications require use of an aluminum alloy fluid conduit having an external coating or cover of nylon or other plastic material. One such tubing is currently marketed under the trademark HYCOT. There is therefore a need in the art for a quick-connect assembly and method of manufacture in which plastic-coated tubing of this character can be rapidly and economically secured to the connector fitting without damaging the plastic coating. A general object of the present invention is to provide a method of manufacturing such a quick-connect, and the resulting product. Another and more specific object of the present invention is to provide such a quick-connect assembly and method of manufacture in which the plastic-coated tubing is securely fastened to the fitting so as to meet or exceed applicable pull force specifications. Another object of the invention is to provide a quick-connect assembly and method of the described character that reliably seals against fluid leakage.

A quick-connect assembly in accordance with the present invention includes a hollow tubular fitting having axially spaced ends and an outer surface with at least one circumferential groove or channel. A tubular conduit of plastic-coated electrically conductive composition is received over one end of the fitting, and is magnetically deformed so as to extend into the channel on the fitting adjacent to the fitting end for fastening the conduit to the fitting. A coupling is rotatably mounted on the opposing end of the fitting for fastening the fitting to a mating coupling, and carries an elastomeric seal in sliding engagement with the conduit or the fitting for preventing leakage of fluid through the assembly.

In the preferred embodiments of the invention, the fitting has three axially spaced channels, with the tubular conduit being magnetically deformed into two of these channels adjacent to one end of the fitting, and with the channel at the opposing end of the fitting cooperating with a radially aligned channel on the coupling for receiving a lock ring to fasten the coupling to the fitting. The middle channel on the fitting has a sloping surface against which the end of the conduit is magnetically formed so that the outer edge of the conduit end is disposed at substantially the adjacent surface of the fitting. In this way, the elastomeric seal carried by the coupling may be slid over the fitting and over the edge of the conduit without being rolled or abraded by the end of the conduit. The sloping surface of the conduit also acts to compress the seal uniformly.

A method of manufacturing a quick-connect assembly in accordance with the present invention thus includes the step of providing a hollow tubular fitting having an outer surface with at least one and preferably a plurality of spaced circumferential channels. A plastic-coated tube of electrically conductive composition such as aluminum alloy is fitted over one end of the fitting so as to encircle one or more of the channels in the fitting. The tube is then magnetically deformed into the underlying channels so as to fasten the tube to the fitting without damaging the plastic coating on the tube. A coupling is then mounted on the fitting in such a way that the coupling is freely rotatable with respect to the fitting and in sealing engagement with the fitting or, more preferably, with the outer surface of the plastic-coated tube.

BRIEF DESCRIPTION OF THE DRAWINGS

The invention, together with additional objects, features and advantages thereof, will be best understood from the following description, the appended claims and the accompanying drawings in which:

FIG. 1 is a partially sectioned elevational view of a quick-connect coupling assembly in accordance with one presently preferred embodiment of the invention;

FIG. 2 is a sectional view taken substantially along the line 2—2 in FIG. 1;

DETAILED DESCRIPTION OF PREFERRED EMBODIMENTS

Figure 3:
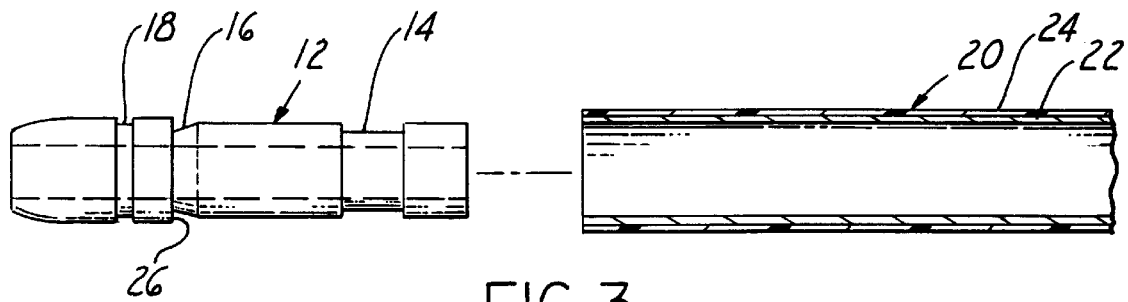
FIG. 3 is an exploded elevational view that illustrates one stage in the manufacture of the assembly of FIG. 1.

FIGS. 1–2 illustrate a connector assembly 10 in accordance with a presently preferred embodiment of the invention as comprising a hollow cylindrical tubular fitting 12 having three axially spaced circumferential channels 14, 16, 18 formed in the outer surface thereof. Channel 14 is of generally rectangular cross section, while channel 16 is formed by a conical wall that is coaxial with the central axis of fitting 14 and tapers narrowingly away from channel 14 and toward channel 18. Channel 18 is generally rectangular, and is disposed adjacent to the end of fitting 12 that is tapered or otherwise contoured for mating engagement with an opposing fluid connection.

Externally received over one end of fitting 14 is a tubular conduit 20 that comprises a metal tube 22 externally coated with a layer of plastic 24. In one presently preferred implementation of the invention, conduit 20 comprises 3103 aluminum tube stock externally coated or covered with PA12 nylon, marketed under the trademark HYCOT. Plastic coating 24 protects tube 22 from corrosion, and it is therefore important that conduit 20 be secured to fitting 12 without abrading coating layer 24. This is accomplished in accordance with the presently preferred method of the invention by placing the end of conduit 20 over the opposing end of fitting 12 until the flat end face of conduit 20 is brought into abutment with the axially facing shoulder 26 of channel 16. The sub assembly of conduit 20 and fitting 12 is then placed in a suitable fixture and subjected to a magnetic (electromagnetic) forming operation so as to deform the wall of conduit 20 into channels 14 and 16. Suitable magnetic forming techniques are known in the art, and generally contemplate placement of an electric coil around the workpiece, in this case the subassembly of conduit 20 on fitting 12, and discharge of electric current through the coil. The resulting magnetic field generates an opposing current in metal tube 22. The interaction of the opposed magnetic fields causes deformation of the tube stock into the fitting channels. Such a magnetic forming operation has the advantage of securely fastening conduit 20 to fitting 12 without abrading or otherwise damaging the integrity of plastic coating 24.

After conduit 20 is fastened to fitting 12, a coupling nut 30 is placed over the free end of fitting 12, and slid along the outer surface of fitting 12 and conduit 20 until a lock ring 32 disposed in a radially inwardly facing channel 34 on the inner surface of coupling 30 registers with channel 18 on fitting 12. At this point, lock ring 30 snaps into channel 18 so as to lock coupling 30 in position on fitting 12 while permitting free rotation of coupling 30 with respect to fitting 12 and conduit 20. An annular elastomeric seal or O-ring 36 is disposed in a second radially inwardly facing channel 38 on the inner surface of coupling 30 in compressed sealing engagement with the outer surface of conduit 20 between channels 14, 16 on fitting 12. The depth of channel 16 preferably is such that the outer edge of the free end of conduit 20 after deformation into channel 16 is disposed at substantially the adjacent outer surface of fitting 12 so that O-ring 36 may be freely slid over the end of conduit 20 without engagement with the free end of the conduit. This helps prevent abrasion or twisting of the O-ring, which could deleteriously affect the sealing function of the O-ring against the outer surface of conduit 20.

Figure 4:
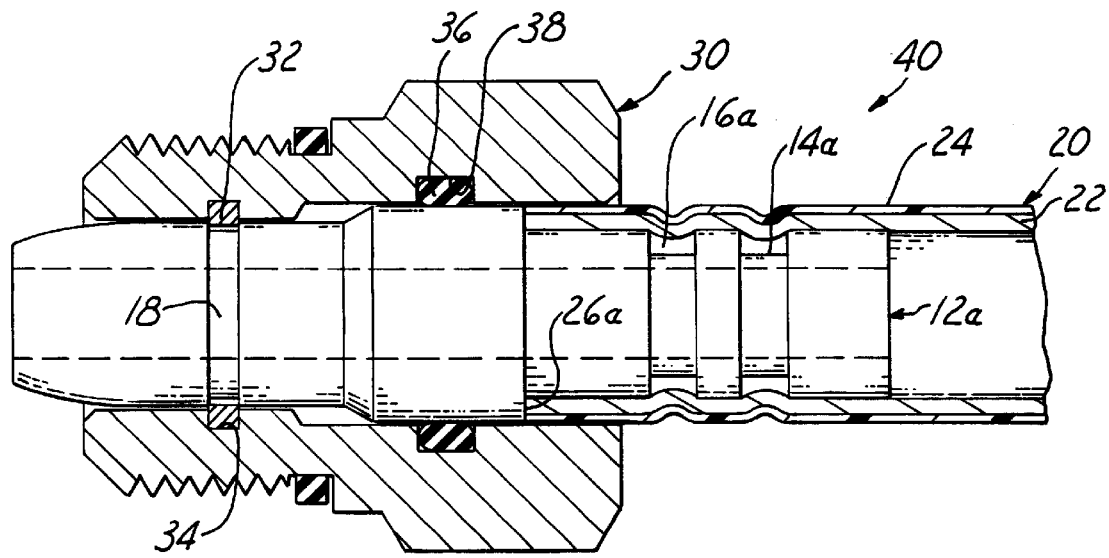
FIGS. 4 and 5 are sectional views similar to that of FIG. 1 but illustrating respective modified embodiments of the invention.
Figure 5:
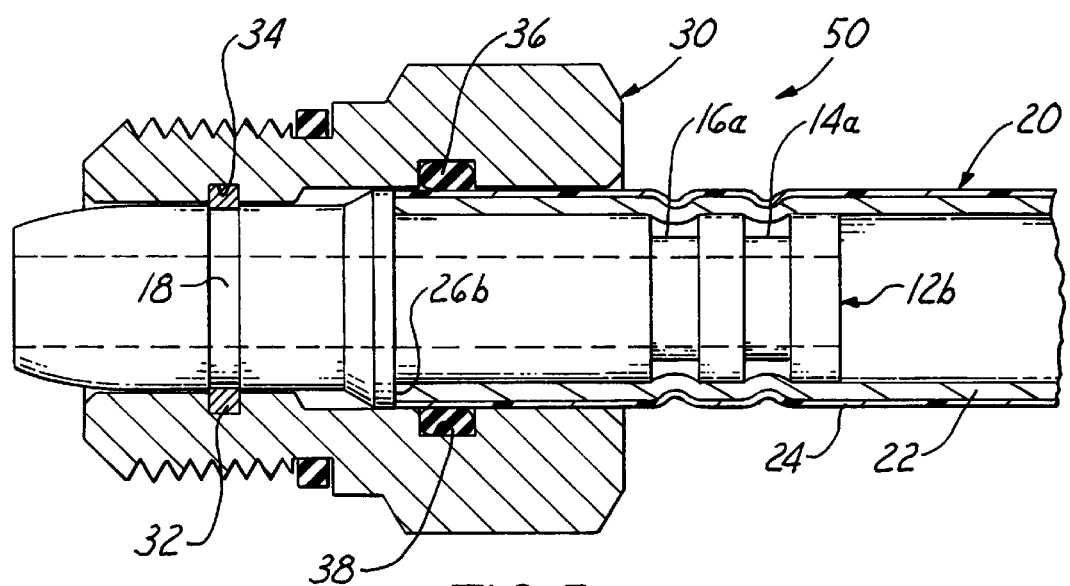

FIG. 4 illustrates a connector assembly 40 in accordance with a modified embodiment of the invention, in which channels 14a, 16a are formed closely adjacent to the end of fitting 12a and are both of rectangular construction. Conduit 20 is magnetically deformed into channels 14a, 16a of fitting 12a as in the previous embodiment, with the end of conduit 20 being in abutting engagement with an axially facing shoulder 26a on fitting 12a. O-ring 36 engages the outer circumference of fitting 12a between shoulder 26a and channel 18. The embodiment of FIG. 4 performs satisfactorily in terms of pull force retention of conduit 20 with respect to fitting 12a. However, a potential fluid leakage path exists between fitting 12a and conduit 20, and then between conduit 20 and coupling 30, because O-ring 36 engages fitting 12a rather than the outer surface of conduit 20. This potential problem is eliminated in the assembly 50 illustrated in FIG. 5 in which shoulder 26b on fitting 12b is positioned closer to channel 18 so that O-ring 36 of coupling 30 sealingly engages the outer surface of conduit 20 rather than fitting 12b. Assembly 50 exhibits both adequate pull force characteristics and fluid-tight sealing. However, the embodiment of FIGS. 1–3 is preferred because conical deformation of the conduit end in FIG. 1 provides an camming surface for elastomeric expansion of O-ring 36, and also helps insure that the inner diameter of the O-ring will not engage the outer edge of the free end of the tube, which could roll, abrade or cut the O-ring during assembly.

I claim:

1. A connector assembly that comprises:
    a hollow tubular fitting having axially spaced ends and an outer surface with at least two axially spaced circumferential channels in said outer surface,
    a tubular conduit received over one end of said fitting and having a wall deformation extending into at least one of said channels adjacent to said one end for fastening said conduit to said fitting,
    a coupling received over an opposing end of said fitting and over an end of said conduit encircling said fitting, said coupling having an internal surface surrounding said fitting and said tube end with a pair of axially spaced circumferential channels,
    a lock ring disposed in one of said fitting channels and in one of said coupling channels adjacent to said opposing end of said fitting for locking said coupling on said fitting, and
    an elastomeric seal disposed in the other channel on said coupling rotatably in sliding sealing engagement with one of said conduit and said fitting.

2. The connector assembly set forth in claim 1 wherein said fitting has at least three axially spaced circumferential channels, and wherein said conduit has deformations extending into two of said channels adjacent to said one end of said fitting.

3. The connector assembly set forth in claim 2 wherein one of said two channels spaced from said one end of said fitting has a conical wall that tapers narrowingly away from said one end of said fitting, and wherein one of said deformations comprises an end of said conduit deformed against said conical surface such that an outer edge of said conduit is disposed at substantially the outer surface of said fitting adjacent to said one channel.

4. The connector assembly set forth in claim 3 wherein said elastomeric seal is in sealing engagement with an outer surface of said conduit between said two channels on said fitting.

5. The connector assembly set forth in claim 2 wherein said elastomeric seal is in sealing engagement with an outer surface of said conduit.

6. The connector assembly set forth in claim 2 wherein said elastomeric seal is in sealing engagement with the outer surface of said fitting.

7. The connector assembly set forth in claim 1 wherein said conduit is of coated electrically conductive composition and is magnetically deformed into said at least one channel.

8. A connector assembly that comprises:
    a hollow tubular fitting having axially spaced ends and an outer surface with at least one circumferential channel,
    a tubular conduit of plastic-coated electrically conductive composition received over one end of said fitting and being magnetically deformed to extend into said channel adjacent to said one end for fastening said conduit to said fitting,
    a coupling mounted on an opposing end of said fitting, and
    an elastomeric seal carried by said coupling in sliding sealing engagement with an outer surface of said conduit or said fitting.

9. The connector assembly set forth in claim 8 wherein said fitting has at least three axially spaced circumferential channels, and wherein said conduit has deformations extending into two of said channels adjacent to said one end of said fitting.

10. The connector assembly set forth in claim 9 wherein one of said two channels spaced from said one end of said fitting has a conical wall that tapers narrowingly away from said one end of said fitting, and wherein one of said deformations comprises an end of said conduit deformed against said conical surface such that an outer edge of said conduit is disposed at substantially the outer surface of said fitting adjacent to said one channel.

11. The connector assembly set forth in claim 10 wherein said elastomeric seal is in sealing engagement with an outer surface of said conduit between said two channels on said fitting.

12. A method of making a connector assembly that comprises the steps of:
    (a) providing a hollow tubular fitting having an outer surface with at least one circumferential channel,
    (b) placing a plastic-coated tube of electrically conductive composition over one end of said fitting so as to encircle at least one channel in said fitting, (c) magnetically deforming said tube into said at least one channel on said fitting so as to fasten said tube to said fitting without damaging the plastic coating on said tube, and then (d) mounting a coupling on said fitting in such a way that said coupling is freely rotatable with respect to said fitting and in sealing engagement with said tube or said fitting.

13. The method set forth in claim 12 wherein said fitting outer surface has at least two axially spaced circumferential channels, and wherein said tube is deformed in said step (c) into both of said channels.

14. The method set forth in claim 13 wherein the one of said at least two channels non-adjacent to said one end of said fitting has a surface that slopes away from said one end of fitting and a depth remote from said one end of said fitting substantially equal to the thickness of said tube, and wherein said step (c) comprises the step of magnetically deforming an end of said tube into said one channel such that the outer edge of said tube is disposed at substantially the outer surface of said fitting.

15. The method set forth in claim 13 wherein said step (d) comprises the steps of:

(d1) providing a circumferential channel on an inner surface of said coupling, and (d2) positioning an annular elastomeric seal in said channel of said coupling for sliding sealing engagement with said tube or said fitting.

16. The method set forth in claim 15 wherein said channel is positioned in said coupling such that said annular elastomeric seal is in sliding engagement with an outer surface of said tube.

17. The method set forth in claim 15 wherein said step (d) comprises the additional steps of:

(d3) providing radially opposed circumferential channels on said fitting and said coupling, and (d4) positioning a lock ring in said radially opposed channels so as to fasten said coupling onto said fitting.

18. A connector assembly that comprises:

a hollow tubular fitting having axially spaced ends and an outer surface with first and second axially spaced circumferentially continuous zero pitch external channels, a tubular conduit having a wall construction comprising a metallic interior tube and a corrosion resistant coating covering the exterior surface of said tube, said conduit having an open end telescopically received over one end of said fitting and having a first deformation of said wall construction extending into said first channel adjacent to said one fitting end for non-threadably fastening said conduit to said fitting, a coupling telescopically received over an opposing end of said fitting and over said end of said conduit and thereby encircling both said fitting and said conduit end, said coupling having an internal surface surrounding said fitting and said conduit end and being provided with first and second axially spaced circumferentially continuous zero pitch internal channels, a lock ring disposed in said second fitting external channel and in said second coupling internal channel adjacent to said opposing end of said fitting for rotatably locking said coupling on said fitting, and an elastomeric seal disposed in said coupling first internal channel in sliding sealing engagement with one of said conduit and said fitting.

19. The connector assembly set forth in claim 18 wherein said fitting has a third circumferentially continuous zero pitch external channel, and wherein said conduit has a second deformation of said wall construction extending into said fitting third external channel adjacent to said one end of said fitting.

20. The connector assembly set forth in claim 18 wherein said metallic interior of said conduit is electrically conductive and said coating is a deformable plastic composition, and wherein said first deformation of said wall construction is magnetically deformed into said fitting external first channel.

* * * * *